INVENTORS
JOHN PAUL THORNE
ALBERT W. PLAEHN
BY
ATTORNEYS

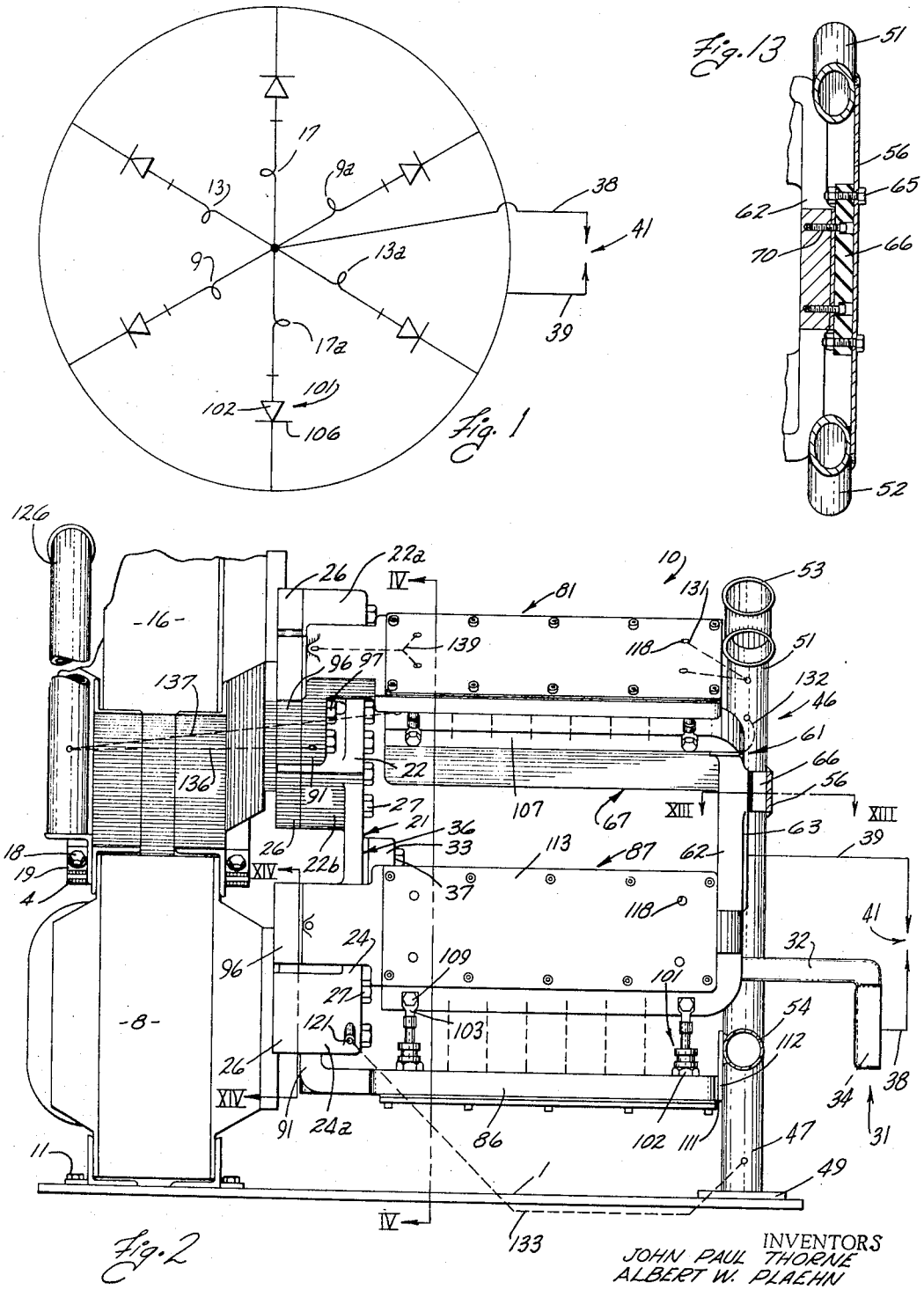

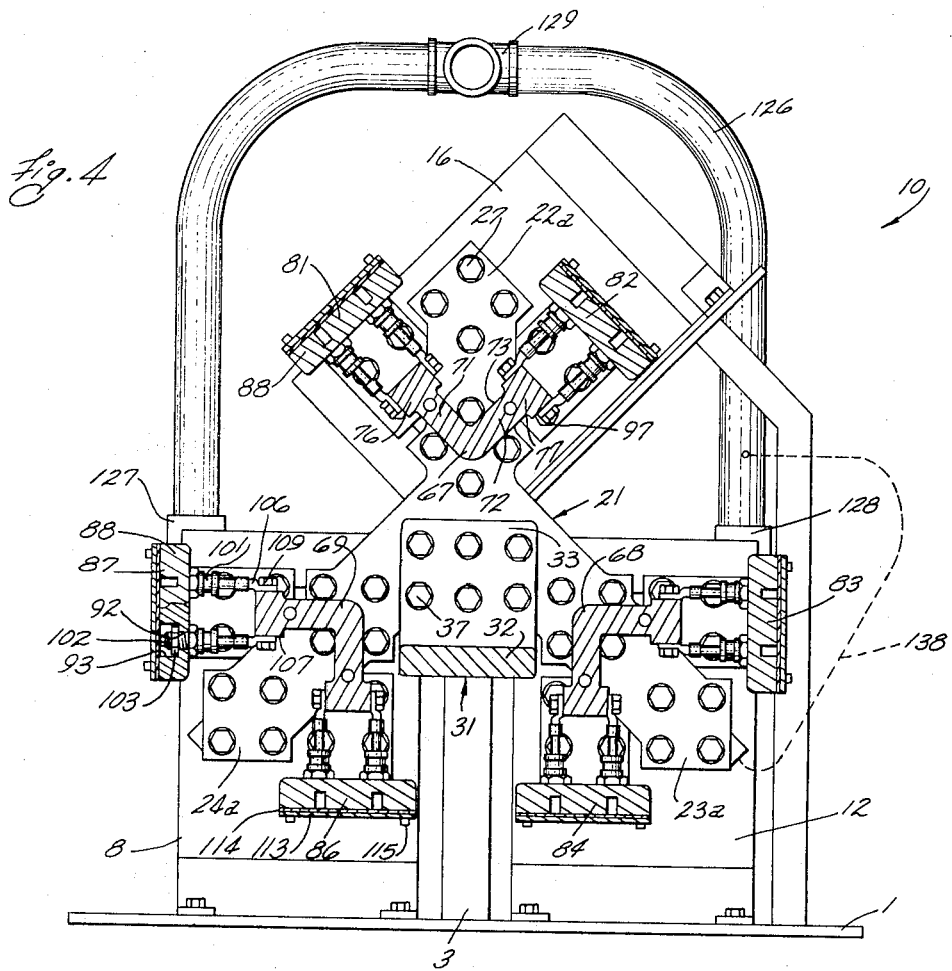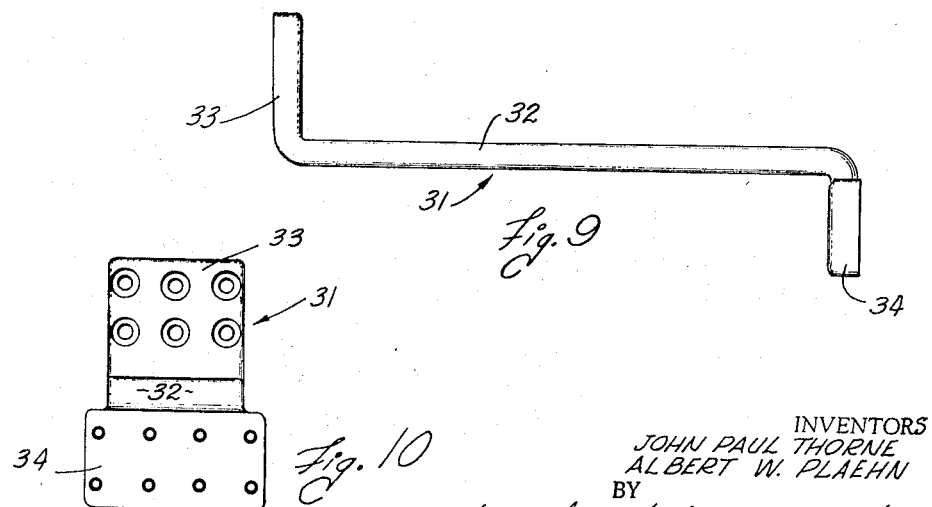

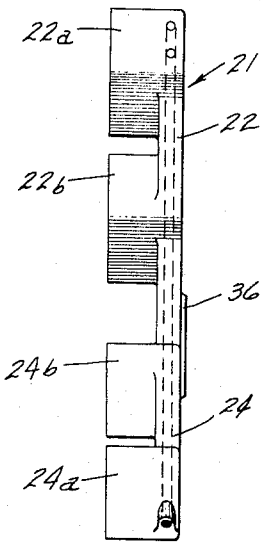
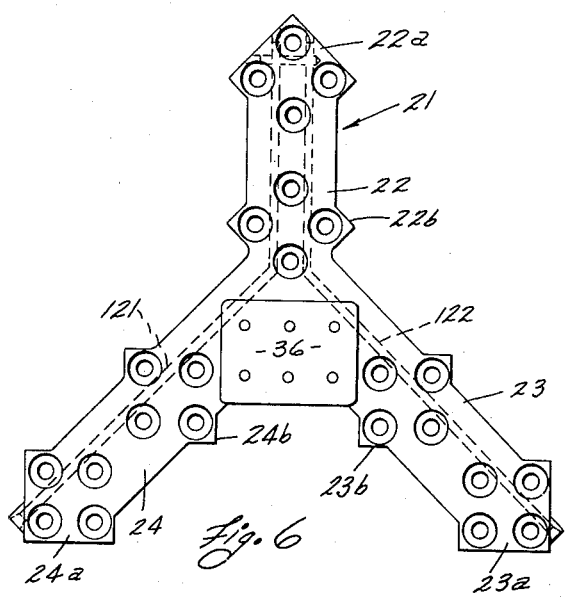
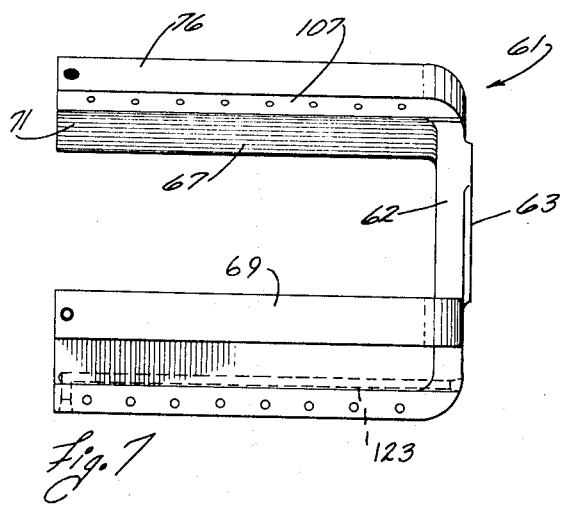
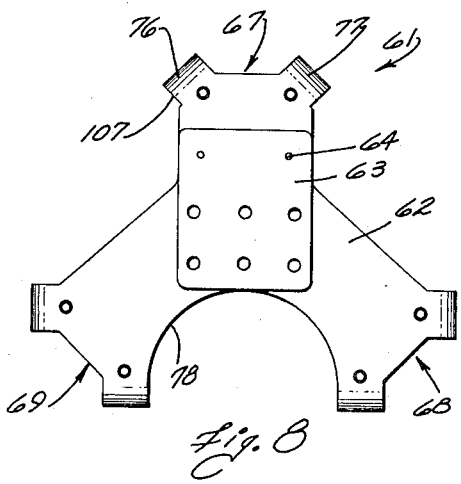
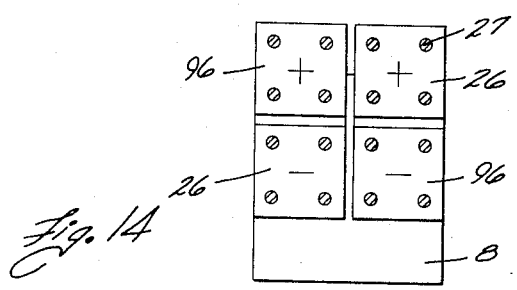

United States Patent Office
3,361,951
Patented Jan. 2, 1968

3,361,951
DIRECT CURRENT POWER SUPPLY MEANS WITH BALANCED DELIVERY PATHS
John Paul Thorne and Albert W. Plaehn, Bay City, Mich., assignors to National Electric Welding Machines Co., Bay City, Mich., a corporation of Michigan
Filed Dec. 24, 1964, Ser. No. 420,949
5 Claims. (Cl. 321—8)

ABSTRACT OF THE DISCLOSURE

A system having a symmetrically balanced power supply means for supplying rectified current to a load, such as resistance welding tips, from a three-phase source having at least three transformers in substantially equal spacing circumferentially around a center, said three transformers being provided with at least two secondary windings and corresponding terminals on each of said secondaries connected to said common conductor which is connected to one side of the load. The other side of each of said secondaries is connected to a conductive carrier holding a plurality of rectifying devices arranged in such a way as to substantially eliminate differences in resistance and reactances between different current paths therethrough. The other side of the rectifying devices are connected to a member secured to the other side of said load. Thus, with the primary windings of each of said transformers connected to separate phases of a three-phase alternating voltage source, suitably rectified and well balanced D.C. current pulses will be provided to the load, said pulses originating from different phases of the power supply and being sufficiently uniform in magnitude with respect to each other so that the current supply to the load will be of relatively uniform value throughout.

---

This invention relates to an electric welding machine and particularly to such a machine having a symmetrically balanced power supply means for supplying rectified current to a load, such as resistance welding tips, from a three-phase source.

Inasmuch as the problems out of which the present invention arose existed with respect to the supplying of electrical power to resistance welding equipment, the following discussion will be set forth in terms of a power supply for resistance welding equipment. However, it will be recognized that other types of high amperage loads, such as electroplating or heating will present similar problems and that at least in its broader aspects this invention will be also applicable thereto. Therefore, it will be understood that the hereinafter following discussion and description will refer to resistance welding solely for illustrative purposes and the use of terminology relating to resistance welding will not be taken as limiting.

It has been found that there are certain uses of electrical resistance welding equipment, such as the welding of critical aircraft type materials, where a relatively longer unidirectional current pulse is desired than can be obtained from conventional single phase power supply apparatus. This has for a long time in the past been solved by use of three-phase power supply equipment and such is well recognized by the industry. However, previously known equipment of this type has generally been incapable of accurately balancing the phases with respect to each other and, more particularly of insuring that conductors carrying each of the phases present identical impedances to the flow of the welding current. While balanced circuits, as such, have been known previously, the ones relating to the supply of welding current with which I am acquainted have either been of insufficient precision in accomplishing the balancing function or they have been too expensive and/or inconvenient to manufacture or use to make an acceptable commercial product.

Therefore, the objects of the invention include:

(1) To provide a transformer-rectifier power supply unit for a high amperage load operable from a three-phase source from which the respective outputs corresponding with each of the three input phases are accurately balanced with respect to each other.

(2) To provide a device, as aforesaid, which is particularly applicable to supplying the welding electrodes of an electric resistance welding machine.

(3) To provide a device, as aforesaid, which is sufficiently compact as to be readily mountable within the housing of a resistance welding machine of conventional size.

(4) To provide a device, as aforesaid, wherein the rectifiers are readily accessible for inspection and/or replacement.

(5) To provide a device, as aforesaid, which is composed of a relatively few simple parts such that it can be both manufactured and maintained in good operating condition at a minimum of cost.

(6) To provide a device, as aforesaid, which is readily adapted to appropriate water cooling to maintain both sides of each of the several rectifiers at approximately similar temperatures.

(7) To provide a device, as aforesaid, having minimum length of path for each of the respective circuit components.

(8) To provide apparatus, as aforesaid, wherein the transformers are readily accessible from the outside of the machine for repair or replacement as needed.

Other objects and purposes of the invention will be apparent to persons acquainted with apparatus of this general type upon reading the following disclosure and upon inspecting the accompanying drawings.

In the drawings:

FIGURE 1 is a schematic circuit diagram of the electrical secondary and rectifier circuit embodied in the present apparatus.

FIGURE 2 is a partially broken side elevational view of apparatus embodying the invention.

FIGURE 4 is a partially broken sectional view substantially as taken on the line IV—IV of FIGURE 2.

FIGURE 5 is a side elevational view of a spider associated with the apparatus of FIGURE 2.

FIGURE 6 is an end elevational view of the spider of FIGURE 5 taken from the rightward end thereof.

FIGURE 7 is a side elevational view of a rectifier terminal member used in the apparatus of FIGURE 1.

FIGURE 8 is an end elevational view of the rectifier terminal member of FIGURE 7 taken from the rightward end thereof.

FIGURE 9 is a side elevational view of a bus bar utilized in the apparatus of FIGURE 1.

FIGURE 10 is an end elevational view of the bus bar of FIGURE 9 from the leftward end thereof.

FIGURE 13 is a fragmentary sectional view substantially as taken on the line XIII—XIII of FIGURE 2.

FIGURE 14 is a fragmentary sectional view substantially as taken on the line XIV—XIV of FIGURE 2.

General description

Figure 3:
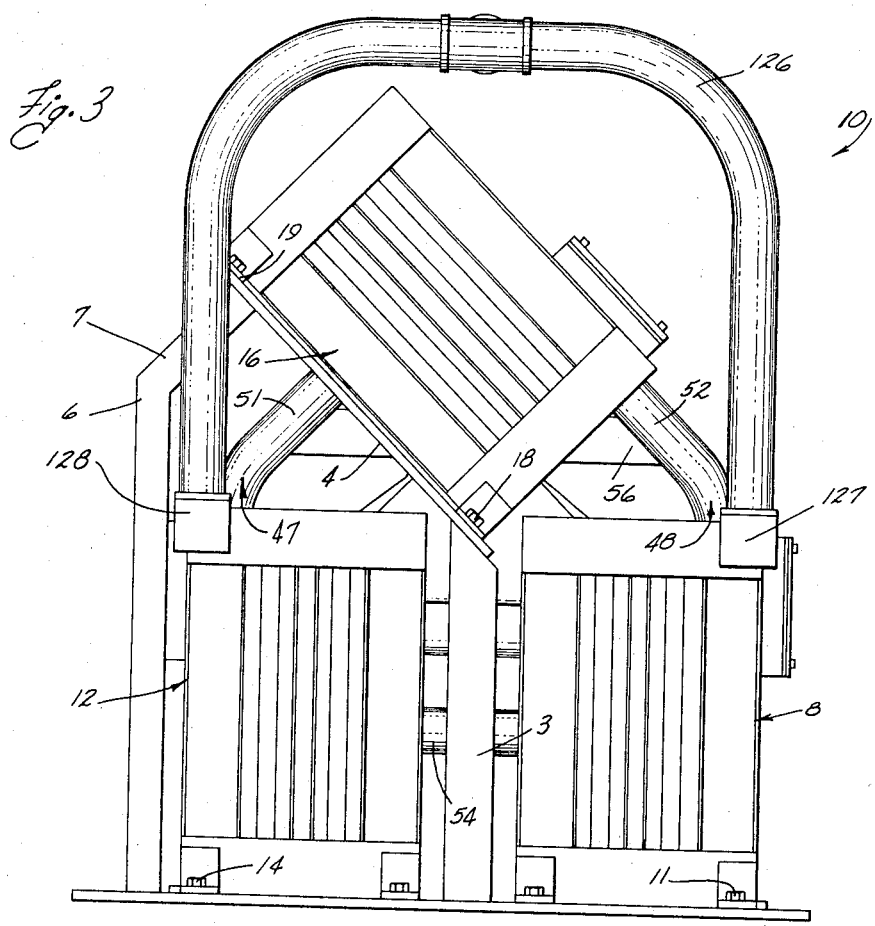
FIGURE 3 is an end elevational view taken from the leftward end of the apparatus of FIGURE 2.

In general, the invention contemplates placing at least three transformers in substantially equal spacing circumferentially around a center and mounting same fixedly in said position. Said three transformers are each provided with at least two secondary windings and corresponding terminals of each of said secondaries are connected to a first common point which is then connected by a suitable conductor to one side of a load. The other side of each of said secondaries is connected to a respective one of a plurality of mutually parallel, elongated plate-like carriers. A second group of plate-like devices is arranged with each thereof spaced from a respective one of said carriers, said second group of plates being connected to a common web and thence to the other side of the load. Pluralities of suitable rectifying devices are connected from each of said carriers to respectively adjacent ones of each corresponding one of said plate-like devices. Said carriers and plate-like devices are arranged to substantially eliminate differences in resistance and reactance between different current paths. With the primary windings of each of said transformers connected to separate phases of a three-phase alternating voltage source, suitably rectified and well balanced D.C. current pulses will be provided to the load, said pulses originating from different phases of the power supply and being sufficiently uniform in magnitude with respect to each other so that the current supply to the load will be of relatively uniform value throughout.

*Detailed description*

In the following description certain terminology will be used for convenience in reference, but it will be recognized as being employed solely for convenience and without limiting significance. For example, the terms "inwardly" and "outwardly" will relate to directions toward and away from the geometric center of the apparatus embodying the invention. The terms "rightwardly" and "leftwardly" will relate to directions as appearing in the drawings to which reference is made in a given instance. The terms "front" and "rear" will refer to the parts of the device adjacent and remote from, respectively, the welding tips in the illustrated embodiment, the "front" being the rightward side in FIGURE 2 and the "rear" being the leftward.

Turning now to the FIGURES 2 and 3, the apparatus 10 chosen to illustrate the invention includes a base or mounting plate 1, which may be fixed in any convenient manner to a power utilizing device of any convenient type, such as a welding machine, not shown, with which the apparatus 10 is to be used. A first transformer 8 of any convenient type having at least two secondary windings 9 and 9a (indicated schematically in FIGURE 1) is mounted on the plate 1 at the rearward end thereof and is affixed thereto in any convenient manner, such as by bolts of which one is indicated at 11. In the specific embodiments of this invention now being built, said transformers usually have multiple primary windings which are connected in series or in parallel as desired to meet particular operating requirements. However, in some instances, a single primary winding will be acceptable without departing from the spirit of the invention. It is also contemplated that the transformer may have a single, center tapped secondary winding. By the same token, said first transformer 8 may conceivably be a pair of transformers each having a single primary and a single secondary winding, said secondary windings being provided with independent terminals and said primary windings being suitably interconnected for simultaneous energization. A second transformer 12, preferably substantially identical to said first transformer 8, has a pair of secondary windings 13 and 13a (indicated schematically in FIGURE 1) and is affixed to said mounting plate 1 (FIGURE 3) adjacent the first transformer 8 by any suitable means such as bolts of which one appears at 14. An upright 3 extends upwardly from the plate 1 between the transformers 8 and 12 substantially to the height of said transformers. A further upright 6 is spaced outwardly from the transformer 12 and terminates at its upper end in an inwardly sloped portion 7. An inclined platform 4 is supported on and between the uprights 3 and 6. A third transformer 16, preferably substantially identical with said first transformer 8, is also provided with a pair of secondary windings 17 and 17a (indicated schematically in FIGURE 1). The third transformer 16 is supported by said inclined platform 4 and preferably includes suitable mounting feet 19 affixed by any suitable means such as bolts one of which appears at 18, to the platform 4.

A substantially Y-shaped and conductive spider 21 (FIGURES 5 and 6), preferably of solid copper, has three radially extending arms 22, 23 and 24 which preferably are similar and substantially equally angularly spaced from each other. The arm 22 is provided with rearwardly (leftwardly as seen in FIGURE 5) raised mounting blocks comprising an outer mounting block 22a located at the outer end of the arm 22 and an inner mounting block 22b located intermediate the ends of the arm 22. In a similar manner, the arm 23 is provided with mounting blocks 23a and 23b and the arm 24 is provided with mounting blocks 24a and 24b. A pair of conductive terminal plates 26 extend from the rightward (FIGURE 2) faces of each of the transformers 8, 12 and 16. The terminal plates 26 correspond in size and location to the mounting blocks 22a, 22b, 23a, 23b, and 24a, 24b of the spider 21, which mounting blocks are affixed to the terminal plates 26 by screws 27. The terminal plates 26 on each transformer each connect to one end of a respective one of the two secondary windings of said transformer the ends so connected being energized in opposite phase by the primary winding of the transformer, as indicated by the plus and minus signs representing instantaneous polarity shown on the upper and lower blocks 26 respectively in FIGURE 14. Thus, the ends of the secondary windings of each transformer which are not connected to the blocks 26 are also energized in opposite phase as indicated in FIGURE 14. The arms 22, 23 and 24 of the spider 21 thereby bring the terminal plates 26 and the ends of the secondary windings connected thereto to an electrical common point.

An elongated, conductive bus bar 31 (FIGURES 9 and 10), preferably of pure copper, includes an elongated central portion 32 having a perpendicular substantially rectangular flange 33 at the leftward (FIGURES 2 and 9) end thereof and a depending substantially rectangular flange 34 at the rightward end thereof. The spider 21 includes a rightwardly (FIGURES 2 and 5) facing contact surface 36 substantially centrally located thereon below the arm 22 to which the leftward face of the upstanding flange 33 on the bus bar 31 is affixed by any convenient means such as screws 37. An electrical current is capable of thereby flowing through the path defined by the transformer secondary windings, external plates 26, spider 21 and bus bar 31. The flange 34 may be connected to one of the terminals 38 and 39, here terminal 38 of a suitable electrical load 41 of any desired type, for example, the welding electrodes of an electric resistance welding machine. It will be noted that the central portion 32 of the bus bar 31 is placed as close as possible to the center of the spider 21 and preferably extends beyond the rightward (FIGURE 2) end of the base plate 1.

A support framework 46 is spaced from the transformers 8, 12 and 16 and is preferably located at the opposite (rightward as seen in FIGURE 2) end of the mounting plate 1. The support framework 46 comprises a pair of substantially upright, spaced tubular members 47 and 48 each having a base flange 49 fixed to the base plate 1. The upper portions 51 and 52 of the members 47 and 48, respectively, incline toward each other from approximately the height of the transformers 8 and 12 and are coupled at their upper ends by a fitting 53. A cross member 54 extends substantially horizontally between the lower portion of the members 47 and 48 and may be affixed thereto by any convenient means such as welding.

A further, preferably platelike, cross member 56 (FIGURES 2 and 3) extends substantially horizontally across the forward side of the support frame 46 and is affixed to the upper portions 51 and 52 by any convenient means such as welding.

A rectifier terminal member 61 (FIGURES 7 and 8) comprises a substantially Y-shaped central web 62 which includes a rightwardly (FIGURES 2 and 7) facing mounting boss 63. An insulating spacer 66 is affixed, as by the nutted bolts 65 to the rearward face of the upper cross member 56. The spacer 66 (FIGURE 13) is in turn fixed to the boss 63 on the web 62 by screws 70 counter sunk in the spacer 66 and threaded into the mounting holes 64 and serves to electrically isolate the web 62 from the framework 46 while supporting said web thereon. When so mounted, the web 62 of the terminal member 61 (FIGURE 2) parallels and is coaxially spaced from the spider 21.

Three parallel arms 67, 68, and 69 (FIGURES 2 and 4) are cantilevered from substantially evenly spaced points of integral connection to the periphery of the central web 62 and extend rearwardly therefrom. The rearward ends of the arms 67, 68 and 69 are spaced from but adjacent the spider 21 and the screws 27 thereof. The arms 67, 68 and 69 are preferably identical and, hence, a description of the arm 67 will suffice for all. The arm 67 is preferably of substantially V-shaped cross section having a pair of side elements 71 and 72 (FIGURES 4 and 7) which preferably are perpendicular to each other for defining a radially outwardly opening (upwardly in the case of the arm 67) trough 73. The longitudinal edge portions of the side elements 71 and 72 are preferably thickened to form ribs 76 and 77, respectively, upon which are terminated the output ends of rectifiers hereinafter described. The central web 62 of the terminal member 61 is relieved between the arms 68 and 69 to form a circular and downwardly concave edge 78 so that the central portion 32 of the bus bar 31 may pass therebeneath in spaced relationship thereto. The terminal member 61 is of conductive material and is preferably of substantially pure copper.

If desired, the side elements 71 and 72, except for the ribs 76 and 77, may be omitted so that the terminal member 61 defines a central web 62 supporting six spaced, parallel and rearwardly extending cantilevered ribs similar to the ribs 76 and 77. However, inclusion of the inner portions of the side elements 71 and 72 is preferred since the V-shaped cross section thereof adds greatly to the rigidity of the cantilevered arms 67, 68 and 69.

The apparatus 10 includes a plurality, here six, of conductive rectifier carriers 81, 82, 83, 84, 86 and 87, which are preferably constructed of substantially pure copper. Said rectifier carriers are preferably identical and hence a description of one thereof will suffice for all. Thus, the rectifier carrier 81 (FIGURES 11 and 12) includes a substantially rectangular plate 88 having an integral extension 89 of reduced width at the leftward end thereof. An upstanding flange 91 is preferably integral with the leftward end of the extension 89. A plurality of mounting holes 92, here sixteen thereof, open through the upper surface of the plate 88 and, in the present embodiment of the invention, are evenly spaced along two longitudinally aligned and identical rows symmetrically disposed on the plate 88. A substantially cylindrical and downwardly opening recess 93 of enlarged diameter communicates with each of the holes 92. Longitudinally adjacent one of recesses 93 are preferably connected by longitudinally extending channels 94.

In addition to the afore-mentioned terminal plates 26, each of the transformers 8, 12 and 16 carries a further pair of substantially square, conductive terminal plates 96 (FIGURE 2). The plates 96 are preferably diagonally located with respect to the plates 26 to occupy therewith a substantially square zone, as shown in FIGURE 14, on the forward face of the transformer. The plates 96 on each transformer each connect to a respective one of the free ends (corresponding to the radially outer ends of the windings of FIGURE 1) of the secondary windings and are insulated from each other. The upstanding flange 91 (FIGURE 2) of each of the carriers 81–84, 86 and 87 is affixed to a different one of the plates 96 by any convenient means such as screws 97. Each flange 91 is orientated so that the plate 88 thereof extends forwardly from that edge of said flange which is farthest from the center of the apparatus 10. In such manner, the carriers 81 and 82 are affixed to the transformer 16 and the plates 88 thereof extend in parallel and equally outwardly spaced relation along substantially the full length of the ribs 76 and 77, respectively, of the arm 67. Moreover, the central plate of each of the side elements 71 and 72 defines the perpendicular bisector of the plate 88 of the respective one of the carriers 81 and 82. The carriers 83, 84 and 86, 87 are preferably arranged in an identical manner with respect to the arms 68 and 69, respectively. Each of the mounting holes 92 in the plates 88 (FIGURES 2 and 4) receives one end 102, here the anode end, of a rectifier 101 for forming two parallel, elongated rows of evenly spaced, inwardly extending rectifiers 101 on each of the plates 88. Each of the ends 102 extends into the corresponding recess 93 and is threaded for receiving a nut 103 thereon for fixing same to said plate 88. Each of the ribs 76 and 77 is snugly disposed between the inner ends of the rows of rectifiers 101 extending from the adjacent plate 88. The inner end 106, here the cathode end, of each rectifier 101 is formed as a lug for connection to the opposed surface 107 of the adjacent rib 76 or 77 by any convenient means such as a screw 109. The axes of the rectifiers 101 thus substantially parallel the corresponding one of the side elements 71 and 72 and are preferably perpendicular to the corresponding supporting plate 88. Should it be desired to provide a reversed polarity at the load 41, it is contemplated that the polarity of the rectifiers 101 may be reversed.

In certain cases it will be desirable, for example, to reduce mechanical stresses on the rectifiers 101, to more rigidly fix the forward end of the plates 88 with respect to the terminal member 61 than has been hereinabove discussed. In the embodiment shown, rigidity has been improved by supporting the forward ends of the rectifier carriers 81–84, 86 and 87 by any suitable insulative means desired on the framework 46. The forward end of the rectifier carrier 86, for example, is connected by an insulative member 111 (FIGURE 2) to a suitable support plate 112 which is in turn welded to the inner side of the member 54 of the framework 46.

If desired, the recesses 93 in each plate 88 may be covered to provide closed channels for cooling water by a suitable cover plate 113 (FIGURES 2 and 4) which in the embodiment shown is substantially coextensive with the plate 88. The cover plate 113 is preferably spaced from the plate 88 by a gasket 114 and is attached thereto by suitable screws 115.

Figure 11:
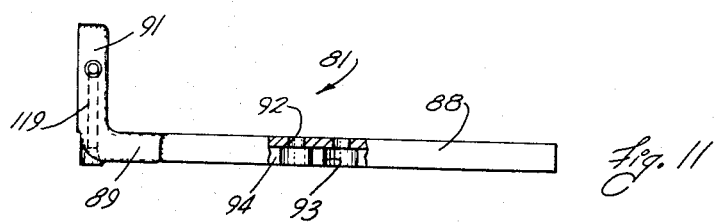
FIGURE 11 is a side elevational view of one of the rectifier carriers used in the apparatus of FIGURE 1.
Figure 12:
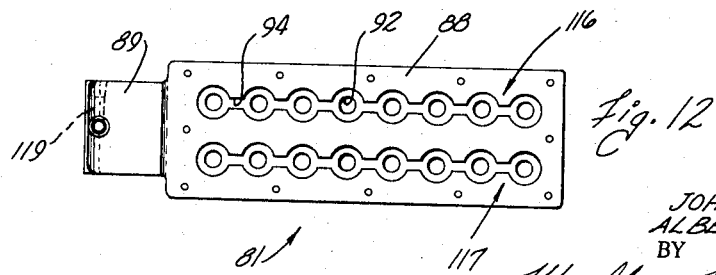
FIGURE 12 is a bottom view of the rectifier carrier shown in FIGURE 11.

When the apparatus 10 is operated at a high amperage, the conductive elements thereof including the spider 21, terminal member 61 and carriers 81–84, 86 and 87, as well as the rectifiers 101, may become excessively heated by the electric current passing therethrough. In the present embodiment of the invention, the spider 21, terminal member 61 and carriers 81–84, 86 and 87 are therefore provided with coolant passages. More specifically, the twin rows of connected recesses 93 in each plate 88 form, when covered by gasketed cover plate 113 as above described, a pair of coolant passages 116 and 117 (FIGURES 11 and 12). Preferably threaded openings 118 in the cover plate 113 allow connection to each end of the passages 116 and 117. A substantially L-shaped coolant passage indicated in broken lines at 119 extends upwardly through a major portion of the flange 91 on each of the carriers 81–84, 86 and 87. The spider 21 includes coolant passages indicated in broken lines at 121 and 122 (FIGURES 5 and 6) which extend from a point of connection at the outer end of the arm 22 inwardly therealong and then outwardly along the arms 24 and 23, respectively. Similarly, a substantially L-shaped coolant passage indicated in broken lines at 123 (FIGURE 7) extends substantially through the length of each of the ribs 76 and 77 of the arms 67, 68 and 69 on the terminal member 61. Thus, the passages 119, 121 and 122 are provided to prevent excessive heating of the secondary terminal connections on transformers 8, 12 and 16 and passages 116, 117 and 123 are intended to maintain the anodes and cathodes of the rectifiers 101 at a similar, relatively low temperature. In the present embodiment of the invention, the members 54, 47 and 48 (FIGURES 2 and 3) of the framework 46 may be supplied coolant liquid, such as water, at the fitting 53. The framework 46 thus defines an inlet manifold for supplying the adjacent forward ends of the coolant passages of the plates 88 and arms 67, 68 and 69 as well as the lower end of the passage 121 in the spider 21 by any convenient means such as flexible hoses. Thus, the carrier 81, the terminal member arm 67 and spider arm 24, for example, receive coolant from the manifold or framework 46 by hoses generally indicated by the broken lines 131, 132 and 133, respectively. Similarly, an outlet manifold 126 (FIGURES 2 and 4) of an inverted U-shape has sealed, downwardly facing ends mounted on the outer and upper corners of the transformers 8 and 12 by brackets 127 and 128. An outlet is connected to the right of the outlet manifold 126 for exhausting heated coolant liquid from the apparatus 10. The outlet manifold 126 preferably connects to the outlet (upper in FIGURE 11) ends of the passages 119 in the carriers 81-84, 86 and 87 (FIGURE 2), to the rearward ends of the passages 123 in the terminal member 61 and to the end of the passage 122 in the spider 21 by any convenient means such as flexible hoses or the like, representative ones of which are generally indicated by the broken lines 136, 137 and 138 (FIGURE 4) extending from the carrier 81, terminal member arm 67 and spider arm 23, respectively.

The rearward ends of the passages 116 and 117 of each of the carriers 81-84, 86 and 87 preferably connect to the outer end of the passage 119 of the same carrier by any convenient means such as a hose such as is generally indicated by the broken line 139 with respect to the carrier 81. If desired, the bus bar 31 may be similarly provided with coolant passages, not shown, connected between the inlet and outlet manifolds 46 and 126 although such will not normally be required.

*Operation*

Although the operation of the apparatus 10 has been discussed somewhat hereinabove, the same will now be summarized for insuring a more complete understanding of the invention.

By referring to the diagram of FIGURE 1 as well as to the physical form of the apparatus 10 as shown in FIGURES 2, 3 and 4, the path of current flow may be readily followed. Alternating current in the primary windings, not shown, of the transformers 8, 12 and 16 results in the appearance of a corresponding alternating voltage across the secondary windings 9, 9a, 13, 13a and 17, 17a of the transformers 8, 12 and 16, respectively. The transformer primary windings are normally energized from separate phases of a three-phase source and therefore the alternating voltages across the secondary windings of each pair of transformers will be displaced in phase from each other by 120°. Due to the presence of the rectifiers 101 in the current path, such voltage causes unidirectional current flow from said secondary windings through the terminal plates 96 and the corresponding flange 91 of the rectifier carriers 81-84, 86 and 87 and thence through the rectifiers 101 connected to such carriers. Current flows from the rectifiers 101 through the arms 67, 68 and 69 of the terminal members 61, through the outlet boss 63 thereof and through the terminal 39 to the load 41 to energize same. Thus, when a three-phase source is employed the load receives one positive pulse of current for each 60° of the source voltage cycle, the overlap between said pulses causing the current through the load to be a constant magnitude D.C. current upon which are imposed positive pulses of relatively small magnitude of which six occur per source cyle. The return path from the load 41 goes through the terminal 38, bus bar 31 and contact surface 36 of the spider 21. Return current flow passes outwardly along the legs 22, 23 and 24 of the spider 21 and through the terminal plates 26 to the remaining ends (these being the radially inner ends in FIGURE 1) of the secondary windings 9, 9a, 13, 13a and 17, 17a.

It will be noted that the current paths connected to each of the secondary windings of the transformers 8, 12 and 16 are at least substantially identical in resistance and reactance and, hence, in electrical impedance since the components connected in series to make up each of the paths are identical to those of the other paths and since the paths are symmetrically arranged with respect to each other. Therefore, the magnitude of current through the load will be the same for all of the phases of the energizing source. Moreover, the apparatus 10, although relatively compact, maintains adequate spacing and insulation between the members thereof to prevent unwanted electrical shorting and is of sufficient rigidity as to maintain itself in an assembled condition without unduly stressing delicate parts thereof, such as the rectifiers 101.

Although a substantially perfectly symmetrical arrangement of the current paths is preferred wherein each current path is substantially identically located with respect to the components defining the remaining current paths, minor deviations from such an ideal arrangement, particularly as may be embodied in the apparatus described herein, will for the most part not introduce current path variations of significance for the abovementioned uses of the apparatus.

Thus, although in the particular embodiment shown, the bus bar 31 extends forwardly from the center of the spider 21 and is substantially centrally disposed with respect to the carriers 81-84, 86, 87 and arms 67, 68 and 69, it is contemplated that the bus bar 31 may be replaced by a bus bar extending substantially radially away from the front surface of this spider, preferably evenly spaced between a pair of the arms 22, 23 and 24 thereof without introducing current path imbalances significant in most applications. Such an arrangement is of use, for example, when the apparatus 10 is mounted on top of a resistance welding machine and the bus bar extends downwardly thereto.

Although the above-described construction and location of the terminal member arms 67, 68 and 69 and of the carriers 81-84, 86 and 87 is preferred, it is contemplated, at least within the broader aspects of the invention, that modified forms of said arms and carriers may be employed, for example, the forwardly extending plates of the carriers of each transformer may lie in a common plane perpendicular to the corresponding spider arm while still being symmetrically spaced on either side of said spider arm and the corresponding one of the V-shaped arms 67, 68 and 69 may be replaced by a planar arm the width dimension of which is coplanar with the corresponding spider arm and hence perpendicular to the plane of the carrier plate.

As a variation of the above example, the modified planar terminal member arms may be parallel to rather than perpendicular to the plane of the mounted coplanar carrier plates. In each of the above examples, it will be noted that carriers and terminal arms are substantially symmetrically arranged with respect to the corresponding spider arm and that the substantially even spider arm and hence terminal arm spacing of the preferred embodiment is retained for retaining substantially similar electrical characteristics.

Although a particular preferred embodiment of the invention has been disclosed hereinabove for illustrative purposes, it will be recognized that variations or modifications thereof which lie within the scope of the appended claims are fully contemplated. The embodiments of the invention in which an exclusive property or privilege is claimed are as follows:

1. In a current conductive electric circuit, the combination comprising:

power supply means having multiple output terminals and multiple common terminals;

a plurality of first conductor means each of which are connected to one of said output terminals;

a plurality of second conductor means spaced from and generally parallel to said first conductor means;

current modifying means connected between corresponding ones of said first conductor means and said second conductor means;

conductive spider means having a plurality of arms interconnecting said multiple common terminals on said supply means;

a load connected between said spider means and said second conductor means and receiving current from said supply means as modified by said modifying means.

2. In an electrical apparatus for supplying pulsed D.C. current to a load from a three-phase source, the combination comprising:

three transformers each being supplied from a separate phase of said three-phase source and each having a pair of secondary windings;

a conductive spider having three substantially similar legs radiating from a central portion, each of said legs being connected to one end of both of said secondary windings of a respective one of said transformers, said one ends being energized in opposite phase;

a conductive bus bar extending axially from said central portion of said spider for connecting same to one side of said load;

six substantially similar conductive carriers, each of which is affixed to the other end of a respective one of said secondary windings and which is spaced from said spider and bus bar;

a conductive terminal member comprising a central web connected to the other side of said load and having six spaced ribs extending axially therefrom, each of said ribs extending in parallelism with a respective one of said carriers, and said ribs being substantially equally spaced from said carriers;

a plurality of rectifiers connecting each of said carriers to the adjacent one of said ribs of said terminal member;

whereby each of said rectifiers will rectify current to said load along a path substantially electrically identical to the paths through which said other rectifiers supply said load.

3. The device defined in claim 2 including a base, one end of which supports first and second ones of said transformers and an inclined platform supported on said base above said first and second transformers for carrying the third one of said transformers in an inclined position thereupon;

a support frame and insulative means on said support frame connected to said web of said terminal member for supporting said terminal member with respect to said base;

further insulative means for connecting the unflanged end of each of said carrier plates to said support frame for supporting same with respect to said base plate.

4. The device defined in claim 2 including an inlet coolant manifold disposed adjacent the web of said terminal member and an outlet coolant manifold disposed adjacent the spider;

coolant passages in said spider, said ribs of said terminal member and said flanges and plate portions of each of said carriers, said passages being disposed for connection between said inlet and outlet manifold for maintaining the temperature of the apparatus at a desired level despite high current flow therethrough.

5. In a three-phase rectification apparatus for providing D.C. current to a load from a three-phase A.C. source, the combination comprising:

three substantially similar transformers each supplied from a different phase of said three-phase source and each including a pair of secondary windings;

a star-shaped, conductive spider comprising three substantially identical arms which extend radially from a central portion and which define equal angles therebetween each of said arms being connected to one end of each of said secondary windings of a respective one of said transformers, said one ends being connected in additive polarity with each other, said transformers being located on one side of said spider;

a conductive bus bar extending perpendicularly away from the other side of said spider and having a flange affixed to the central portion of said spider;

six substantially identical carriers each including a flange connected to the other end of a respective one of said secondary windings, the pair of flanges on each transformer being separated by and spaced from the corresponding arm of said spider, said carriers each including a plate-like portion perpendicular to said flange and extending in spaced and parallel relation along said bus bar;

a conductive terminal member comprising a substantially planar central web coaxial with said spider and from which three parallel substantially identical arms extend toward the respective arms of said spider, each of said arms of said terminal member being of substantially V-shaped, radially outwardly opening cross section, the longitudinal edges of said arms of said terminal members being thickened to define a rib, said ribs being equally spaced from the corresponding carriers, the plate portions of said carriers being perpendicularly bisected by a transverse extension of the adjacent one of said edges;

a plurality of spaced rectifiers connected between each of said plate portions and the corresponding one of said ribs on opposite side of said ribs for defining an equal pair of rows of rectifiers on each of said plate portions, the number of rectifiers connected to each of said ribs being equal and all of said rectifiers being arranged so that the corresponding ends thereof are affixed to said carriers;

a load and means for connecting said load between the central portion of said web and said bus bar;

whereby current is supplied from said other ends of said secondary winding through said carriers, rectifiers and terminal member to said load and a return path is formed from the other side of said load through said bus bar and spider to said one side of said secondary windings.

References Cited

UNITED STATES PATENTS

| | | | |
|---|---|---|---|
| 3,193,754 | 7/1965 | Dortort | 321—27 |
| 3,223,901 | 12/1965 | Riley | 321—8 X |
| 3,289,068 | 11/1966 | Healis | 321—8 |

JOHN F. COUCH, *Primary Examiner.*

W. H. BEHA, *Assistant Examiner.*